United States Patent
Hajian

(10) Patent No.: US 12,417,436 B2
(45) Date of Patent: *Sep. 16, 2025

(54) AUTOMATED PARAMETERIZED MODELING AND SCORING INTELLIGENCE SYSTEM

(71) Applicant: Zebel Group, Inc., Walnut Creek, CA (US)

(72) Inventor: Hamid Hajian, Walnut Creek, CA (US)

(73) Assignee: Zebel Group, Inc., Walnut Creek, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 18/147,328

(22) Filed: Dec. 28, 2022

(65) Prior Publication Data

US 2023/0128318 A1 Apr. 27, 2023

Related U.S. Application Data

(63) Continuation of application No. 16/676,876, filed on Nov. 7, 2019, now Pat. No. 11,568,367.

(51) Int. Cl.
  *G06Q 10/10* (2023.01)
  *G06F 16/951* (2019.01)
  (Continued)

(52) U.S. Cl.
  CPC ......... *G06Q 10/103* (2013.01); *G06F 16/951* (2019.01); *G06F 17/18* (2013.01); *G06N 20/00* (2019.01); *G06F 8/10* (2013.01)

(58) Field of Classification Search
  CPC ...... G06Q 10/103; G06N 20/00; G06F 17/18; G06F 8/10; G06F 8/20
  See application file for complete search history.

(56) References Cited

U.S. PATENT DOCUMENTS

| | | | |
|---|---|---|---|
| 2005/0234761 A1* | 10/2005 | Pinto | G06Q 10/0635 |
| | | | 705/7.31 |
| 2006/0117317 A1* | 6/2006 | Crawford | G06Q 10/0631 |
| | | | 718/104 |

(Continued)

FOREIGN PATENT DOCUMENTS

JP 2019537125 A * 10/2016 ............. G06Q 10/10

OTHER PUBLICATIONS

English translation of JP2019537125A (Year: 2016).*

(Continued)

*Primary Examiner* — Jerry O'Connor
*Assistant Examiner* — Jeremy L Gunn
(74) *Attorney, Agent, or Firm* — Young Basile Hanlon & MacFarlane, P.C.

(57) ABSTRACT

An automated parameterized modeling and scoring intelligence system includes a parameterized score estimation software tool and a parameterized score optimization software tool. The parameterized score estimation software tool processes design metrics associated with a current project according to historical project data selected based on a similarity with at least some of the design metrics to determine a score estimation for the current project. The parameterized score optimization software tool processes the score estimation based on external application data retrieved from an external application to determine an expected yield for the current project. A user of the system may iterate against the score estimation or the expected yield by changing one or more of the parameters used to determine same. The iteration may result in a score estimation or expected yield different from the initial versions thereof, such as to identify an optimal design for the current project.

20 Claims, 10 Drawing Sheets

(51) Int. Cl.
    *G06F 17/18*     (2006.01)
    *G06N 20/00*     (2019.01)
    *G06F 8/10*     (2018.01)

(56) References Cited

U.S. PATENT DOCUMENTS

| | | | | |
|---|---|---|---|---|
| 2006/0178918 | A1* | 8/2006 | Mikurak | G06Q 10/06 |
| | | | | 705/7.31 |
| 2008/0313596 | A1* | 12/2008 | Kreamer | G06Q 10/06315 |
| | | | | 717/101 |
| 2008/0319811 | A1* | 12/2008 | Casey | G06Q 10/06311 |
| | | | | 705/7.13 |
| 2010/0131314 | A1* | 5/2010 | Lo Yuk Ting | G06Q 10/063 |
| | | | | 705/7.11 |
| 2013/0159242 | A1* | 6/2013 | Rahmouni | G06Q 10/06313 |
| | | | | 706/52 |
| 2015/0294246 | A1* | 10/2015 | Guven Kaya | G06Q 10/06393 |
| | | | | 705/7.28 |
| 2016/0342690 | A1* | 11/2016 | Young | G06Q 50/20 |
| 2018/0060759 | A1* | 3/2018 | Chu | G06N 20/00 |
| 2019/0205484 | A1* | 7/2019 | Morkos | G06Q 10/06313 |

OTHER PUBLICATIONS

J. J. Cuadrado-Gallego, P. Rodríguez-Soria and B. Martín-Herrera, "Analogies and Differences between Machine Learning and Expert Based Software Project Effort Estimation," 2010 11th ACIS International Conference on Software Engineering (Year: 2010).*

Cuadrado-Gallego et al., "Analogies and Differences between Machine Learning and Expert Based Software Project Effort Estimation," 11th ACIS International Conference on Software Engineering, Artificial Intelligence, Networking and Parallel/Distributed, 2010, pp. 269-276.

* cited by examiner

AUTOMATED PARAMETERIZED MODELING AND SCORING INTELLIGENCE SYSTEM

CROSS-REFERENCE TO RELATED APPLICATION(S)

This application claims priority to and the benefit of U.S. patent application Ser. No. 16/676,876, filed Nov. 7, 2019, the entire disclosure of which is hereby incorporated by reference.

TECHNICAL FIELD

This disclosure relates to an automated parameterized modeling and scoring intelligence system.

BACKGROUND

Project design planning typically incurs significant time and manual user effort to tediously prepare, revise, and analyze designs. A typical approach may include drafting an initial design according to some limited set of initial design parameters, submitting the designs for review, awaiting design feedback, revising the designs according to the feedback, and potentially suffering late-stage design changes due to previously unconsidered options. Some solutions exist for improving the project design process, but they suffer from several drawings. For example, conventional solutions require detailed, specific parameter information, which may not be available until a later stage of project development. In another example, conventional solutions also fail to leverage highly valuable historical project data such as by recognizing precise similarities between historical projects and a new project for which a design is prepared.

The technical implementation of conventional solutions also suffers from drawbacks in that the platforms are not intelligent, not automated, and not extensible. For example, such conventional solutions do not enable users to extend parameters or change parameters during processing. In another example, such conventional solutions do not automate parameter modeling and scoring, such as because manual user intervention is required at each step and/or because such conventional solutions lack intelligence functionality which analyzes, maps, and/or scores parameterized information. In yet another example, such conventional solutions are not implemented in technical service environments which can be represented using client/server functionality, single or multi-tenant computing environments, or otherwise.

SUMMARY

Disclosed herein are, inter alia, implementations of systems and techniques for automated parameterized modeling and scoring intelligence.

In one implementation, a system for automated parameterized modeling and scoring intelligence comprises a server device included in a service environment and a database. The server device includes a processor, a memory, and a network interface. The network interface enables communications between the server device and a client device. The memory stores instructions executable by the processor for implementing functionality of an automated parameterized modeling and scoring intelligence platform. The database stores information associated with one or more users of the automated parameterized modeling and scoring intelligence platform. The information includes one or more sets of historical project data. The instructions include instructions to: define parameters representing design metrics associated with a current project based on first input received from the client device; select one or more historical projects for modeling the first input parameters, wherein a set of historical project data of the sets of historical project data corresponds to each of the one or more historical projects; determine a score estimation for the current project based on the defined parameters and according to the set of historical project data; perform a regression analysis against the score estimation based on external application data to determine value estimate data for the current project, wherein the external application data is associated with an external application implemented in an external environment separate from the service environment; generate a pro forma for the current project based on the value estimate data; identify one or more first expected yield candidates for the current project based on feedback responsive to the pro forma received from the client device; change one or more of the defined parameters, the set of historical project data, or the external application data in response to a request received from the client device; identify one or more second expected yield candidates for the current project based on the changed one or more of the defined parameters, the set of historical project data, or the external application data; receive a selection of one of the one or more second expected yield candidates as an expected yield; and output a project design corresponding to the expected yield to the client device.

In another implementation, a system for automated parameterized modeling and scoring intelligence comprises a server device that implements an automated parameterized modeling and scoring intelligence platform and a database that stores information associated with one or more users of the automated parameterized modeling and scoring intelligence platform. The automated parameterized modeling and scoring intelligence platform includes a parameterized score estimation software tool and a parameterized score optimization software tool. The parameterized score estimation software tool processes design metrics associated with a current project according to historical project data selected based on a similarity with at least some of the design metrics to determine a score estimation for the current project. The parameterized score optimization software tool processes the score estimation for the current project based on external application data retrieved from an external application to determine an expected yield for the current project and to output a design associated with the expected yield for the current project.

In yet another implementation, a system for automated parameterized modeling and scoring intelligence comprises a server device including a processor and a memory, wherein the processor executes instructions stored in the memory. The instructions include instructions to: receive, from a client device, design metrics associated with a current project and a selection of one or more historical projects; determine a score estimation for the current project based on the design metrics and according to historical project data associated with the one or more historical projects; receive, from an external application, external application data associated with one or more real property sites; determine value estimate data for the current project by performing a regression analysis against the score estimation based on the external application data; identify a set of expected yield candidates based on the value estimate data, wherein each expected yield candidate of the set of expected yield candidates is associated with a design for the current project; receive, from the client device, a selection of one of the expected yield candidates of the set of expected yield candidates; and transmit, to the client device, the design associated with the selected expected yield candidate.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
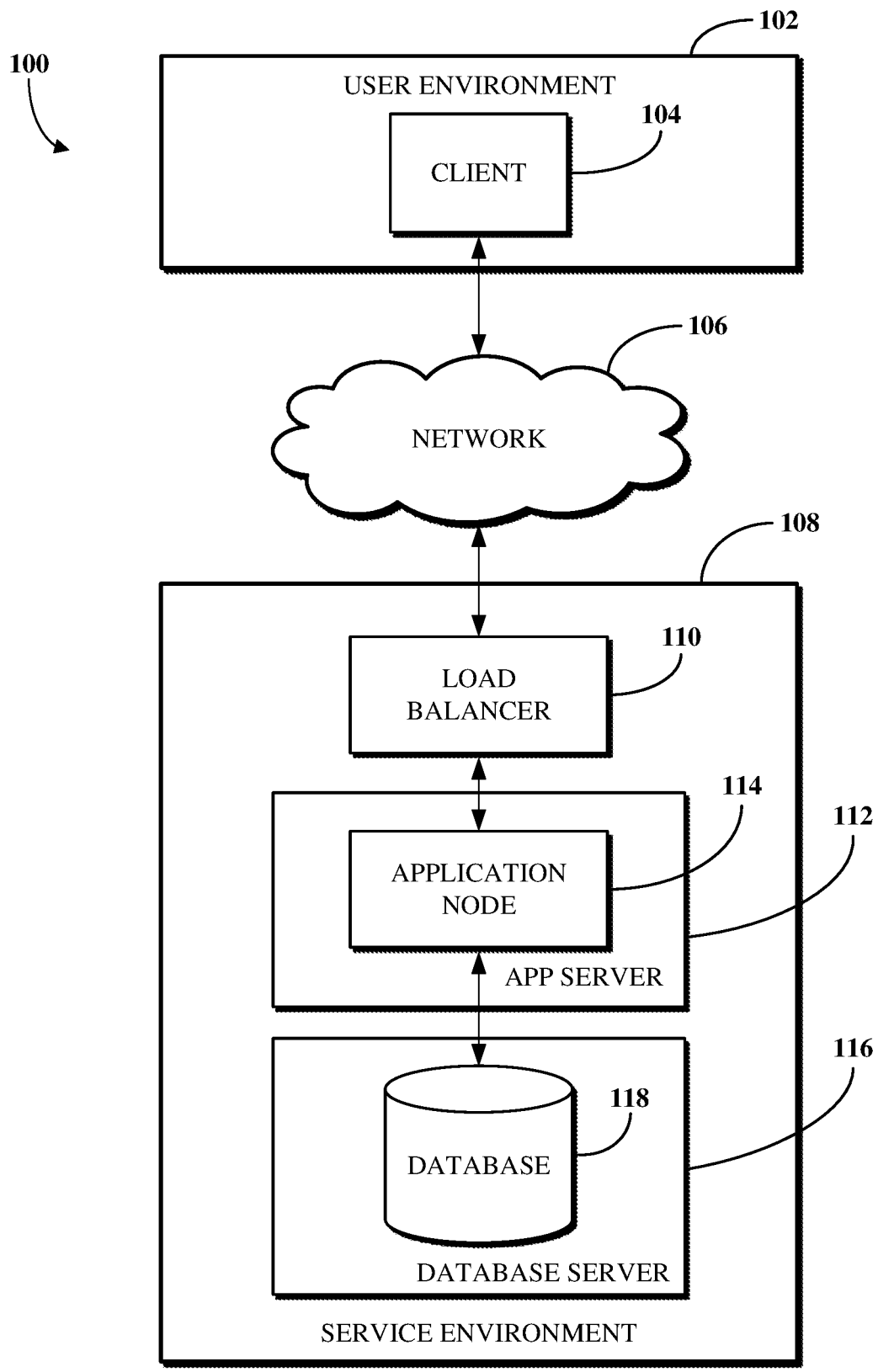
FIG. 1 is a block diagram showing an example of an automated parameterized modeling and scoring intelligence system.

Reference is first made to examples of hardware and software structures used to implement an automated parameterized modeling and scoring intelligence system. FIG. 1 is a block diagram showing an example of an automated parameterized modeling and scoring intelligence system 100. The automated parameterized modeling and scoring intelligence system 100 can be or include a distributed computing system (e.g., a client-server computing system), a cloud computing system, a clustered computing system, or the like.

The automated parameterized modeling and scoring intelligence system 100 includes a user environment 102, which may be or otherwise refer to devices, configurations, objects, or the like under the possession, control, or use by a public entity, private entity, or other corporate entity or individual that purchases or otherwise uses software services. The user environment 102 includes one or more clients. For example, and without limitation, the user environment 102 can include a client 104. The client 104 can include one or more computing devices, such as a mobile phone, a tablet computer, a laptop computer, a notebook computer, a desktop computer, or another suitable computing device or combination of computing devices.

In some implementations, the client 104 can be implemented as a single physical unit or as a combination of physical units. In some implementations, a single physical unit can include multiple clients. In some implementations, the client 104 can be an instance of software running on a device associated with the user environment 102. As used herein, the term "software" can include, but is not limited to, applications, programs, instances, processes, threads, services, plugins, patches, application version upgrades, or another identifiable computing aspect.

A network 106 connects the user environment 102 and a service environment 108. The service environment 108 can include one or more servers used implement software, such as Platform-as-a-Service (PaaS) software, Software-as-a-Service (SaaS) software, software specific to mobile devices, web application software, or other software. For example, and without limitation, the service environment 108, as generally illustrated, includes an application server 112 which implements an application node 114 and a database server 116 which implements a database 118.

In some implementations, the servers in the service environment 108 may be located at a datacenter. A datacenter can represent a geographic location, which can include a facility, where the one or more servers are located. The automated parameterized modeling and scoring intelligence system 100 can include a number of datacenters and servers, or it can include a configuration of datacenters and servers different from that generally illustrated in FIG. 1. In some implementations, the service environment 108 can be associated or communicate with one or more datacenter networks or domains, which can include domains other than a client domain, such as which can be associated with the client 104.

The client 104 and the servers associated with the service environment 108 may be configured to connect to, or communicate via, the network 106. Furthermore, the client 104 associated with the user environment 102 can connect to the network 106 via a communal connection point, link, or path or using a distinct connection point, link, or path. A connection point, link, or path can be wired, wireless, use other communications technologies, or a combination thereof.

The network 106 can be or include the Internet. Alternatively, the network 106 can be or include a local area network (LAN), a wide area network (WAN), a virtual private network (VPN), or another public or private means of electronic computer communication capable of transferring data between a client, such as the client 104, and one or more servers associated with the service environment 108, or a combination thereof. The network 106, the service environment 108, or any other element, or combination of elements, of the automated parameterized modeling and scoring intelligence system 100 can include network hardware such as routers, switches, load balancers, other network devices, or combinations thereof. For example, the service environment 108 can include a load balancer 110 for routing traffic from the network 106 to various servers associated with the service environment 108.

The load balancer 110 can route, or direct, computing communications traffic, such as signals or messages, to respective elements of the service environment 108. For example, the load balancer 110 can operate as a proxy, or reverse proxy, for a service, such as an Internet-delivered service, provided by the service environment 108 to one or more remote clients, such as the client 104, via the network 106. Routing functions of the load balancer 110 can be configured directly or via a Domain Name System (DNS) service. The load balancer 110 can coordinate requests from remote clients, such as the client 104, and can simplify client access by masking the internal configuration of the service environment 108 from the remote clients. The load balancer 110 can operate as a firewall, allowing or preventing communications based on configuration settings.

Although the load balancer 110 is depicted in FIG. 1 as being within the service environment 108, in some implementations, the load balancer 110 can instead be located outside of the service environment 108, for example, when providing global routing for multiple datacenters. In some implementations, load balancers can be included both within and outside of the service environment 108. The inclusion of the load balancer 110 within the service environment 108 does not itself represent that the load balancer 110 is under the direct or indirect possession and/or control of a software provider who provides software implemented using a server of the service environment 108.

In the example shown and as described above, the service environment 108 includes the application server 112 and the database server 116. The application server 112 and/or the database server 116 can be a computing system, which can include one or more computing devices, such as a desktop computer, a server computer, or any other computer capable of operating as a server. In some implementations, the application server 112 and/or the database server 116 can be non-hardware servers implemented on a physical device, such as a hardware server. In some implementations, the application server 112 and the database server 116 can be implemented as a single hardware server or as a single non-hardware server implemented on a single hardware server. In some implementations, the service environment 108 can include servers other than or in addition to the application server 112 or the database server 116, for example, a web server.

The application node 114 is or otherwise refers to a process executed on the application server 112. For example, and without limitation, the application node 114 can be executed in order to deliver services to a client, such as the client 104, as part of a web application, either as standalone software or as an online component to other software. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include a number of application nodes, depending upon a system load or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as the database 118, which can be accessible by an application executed on the application node 114. The database 118 may be implemented as a relational database, an object database, an XML database, a configuration management database (CMDB), a management information base (MIB), one or more flat files, other suitable non-transient storage mechanisms, or a combination thereof. While limited examples are described, the database 118 can be configured as or comprise another suitable database type. Further, the automated parameterized modeling and scoring intelligence system 100 can include one, two, three, or another number of databases configured as or comprising another database type or combination thereof.

In some implementations, one or more databases (e.g., the database 118), tables, other information sources, or portions or combinations thereof may be stored, managed, or otherwise provided by one or more of the elements of the automated parameterized modeling and scoring intelligence system 100 other than the database server 116, such as the client 104 or the application server 112.

Some or all of the systems and techniques disclosed herein can operate or be executed on or by the servers associated with the automated parameterized modeling and scoring intelligence system 100. In some implementations, the systems and techniques disclosed, portions thereof, or combinations thereof can be implemented on a single device, such as a single server, or a combination of devices, for example, a combination of the client 104 and a server which implements the application server 112 and/or the database server 116.

In some implementations, the automated parameterized modeling and scoring intelligence system 100 can include devices other than the client 104, the load balancer 110, and a server which implements the application server 112 and/or the database server 116. In some implementations, one or more additional servers can operate as system infrastructure control aspects, from which servers, clients, or both servers and clients, can be monitored, controlled, configured, or a combination thereof.

The service environment 116 can allocate resources of the user environment 102 using a single-tenant architecture or a multi-tenant architecture. Allocating resources in a multi-tenant architecture can include installations or instantiations of one or more servers, such as application servers, database servers, or another server or a combination of servers, which can be shared amongst multiple user environments or multiple accounts within a single user environment. For example, a web server, such as a unitary Apache installation; an application server, such as a unitary Java Virtual Machine (JVM); or a single database server catalog, such as a unitary MySQL catalog, can handle requests from multiple user environments or multiple accounts within a single user environment. In some implementations of a multi-tenant architecture, the application server, the database server, or both can distinguish between and segregate data or other information of the various users of the system.

In a single-tenant infrastructure, separate web servers, application servers, database servers, or combinations thereof can be provisioned individually for at least some user environments or accounts within a user environment. User environments or accounts within a user environment can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as memory, storage, communications bandwidth, or processor cycles.

A user environment instance can include multiple web server instances, multiple application server instances, multiple database server instances, or a combination thereof. The server instances can be physically located on different physical servers and can share resources of the different physical servers with other server instances associated with other customer instances. In a distributed computing system, multiple user environment instances can be used concurrently. Other configurations or implementations of user environment instances can also be used. The use of user environment instances in a single-tenant architecture can provide true data isolation from other user environment instances, amongst other benefits.

Figure 2:
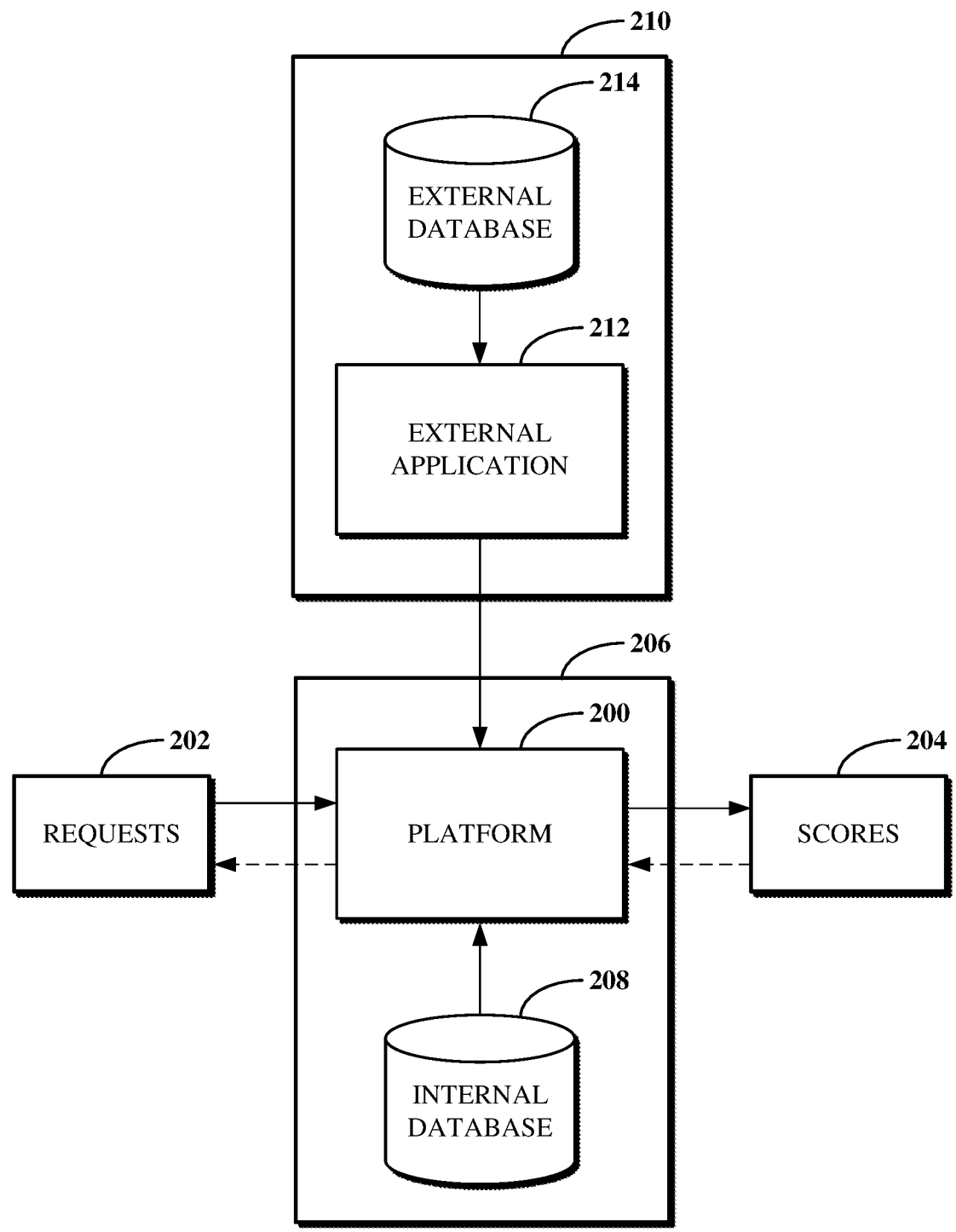
FIG. 2 is a block diagram showing an example of an automated parameterized modeling and scoring intelligence platform of an automated parameterized modeling and scoring intelligence system.

FIG. 2 is a block diagram showing an example of an automated parameterized modeling and scoring intelligence platform 200 of an automated parameterized modeling and scoring intelligence system, such as the automated parameterized modeling and scoring intelligence system 100 shown in FIG. 1. The automated parameterized modeling and scoring intelligence platform 200 is software that receives and processes requests 202 to determine scores 204. The automated parameterized modeling and scoring intelligence platform 200 is implemented within a service environment 206, which may, for example, be the service environment 108 shown in FIG. 1. The service environment 206 includes an internal database 204 which is accessed by the automated parameterized modeling and scoring intelligence platform 200 to process the requests 202 and determine the scores 204. The internal database 204 may, for example, be the database 118 shown in FIG. 1.

The requests 202 are requests for parametric modeling of data using automated and intelligence functionality of the automated parameterized modeling and scoring intelligence platform 200. A request may include information used as input to the automated parameterized modeling and scoring intelligence platform 200. The scores 204 are scores determined using parametric modeling of data associated with the requests 202, such as by using the automated and intelligence functionality of the automated parameterized modeling and scoring intelligence platform 200. A score may be or refer to information output from the automated parameterized modeling and scoring intelligence platform 200.

For example, in implementations in which the automated parameterized modeling and scoring intelligence platform 200 is or includes software for parameterized score estimation for construction projects, a request may include or indicate a set of design metrics representing first input parameter values for a current project and a set of historical project data representing second input parameter values. A score resulting from the processing of the request may include or indicate a total estimated value attributed to the completion of the construct project based on the set of design metrics and according to the set of historical project data.

In another example, in implementations in which the automated parameterized modeling and scoring intelligence platform 200 is or includes software for parameterized score optimization for construction projects, a request may include or indicate a set of design metrics representing first input parameter values for a current project, a set of historical project data representing second input parameter values, and external application data corresponding to real-world property information, such as market value attributions, representing third input parameter values. A score resulting from the processing of the request may include or indicate an optimized score value attributed to the overall yield of the construct project according to the set of design metrics and based on the set of historical project data and the external application data.

In some implementations, the automated parameterized modeling and scoring intelligence platform 200 may be a platform of a PaaS software offering. For example, the automated parameterized modeling and scoring intelligence platform 200 may refer to a single-tenant platform for automated parameterized modeling and scoring intelligence. In such a case, the information within the internal database 208 which is used by the automated parameterized modeling and scoring intelligence platform 200 may be specific to the user environment or account for which the automated parameterized modeling and scoring intelligence platform 200 is instantiated. In another example, the automated parameterized modeling and scoring intelligence platform 200 may refer to a multi-tenant platform for automated parameterized modeling and scoring intelligence. In such a case, the information within the internal database 208 which is used by the automated parameterized modeling and scoring intelligence platform 200 may correspond to multiple user environments or multiple accounts for which the automated parameterized modeling and scoring intelligence platform 200 is instantiated.

In some implementations, the automated parameterized modeling and scoring intelligence platform 200 may be some or all of a SaaS software offering. For example, the automated parameterized modeling and scoring intelligence platform 200 may refer to online or offline software for automated parameterized modeling and scoring intelligence. Similar to with implementations of a PaaS software offering, the SaaS software offering may also include or otherwise leverage a single-tenant structure or a multi-tenant structure.

The internal database 208 is a database included within or otherwise which is accessible by computing aspects of the service environment 206. The internal database 208 stores data used by the automated parameterized modeling and scoring intelligence platform 200. As such, the internal database 208 may be considered a live database of information for aspects processed by or otherwise using the automated parameterized modeling and scoring intelligence platform 200. For example, the data stored within the internal database 208 may include data used by a parameterized score estimation software tool of the automated parameterized modeling and scoring intelligence platform 200 and/or by a parameterized score optimization software tool of the automated parameterized modeling and scoring intelligence platform 200. In the example in which the automated parameterized modeling and scoring intelligence platform 200 is or includes software for parameterized score estimation and optimization for construction projects, the data stored within the internal database 208 may be or include historical project data associated with one or more previous construction projects.

The internal database 208 may be structured based on the particular tenancy-based implementation of the automated parameterized modeling and scoring intelligence platform 200. For example, where the automated parameterized modeling and scoring intelligence platform 200 is single-tenant, the internal database 208 may include an entire database storing information dedicated to the user environment or account for which the single-tenant instance is instantiated. In another example, where the automated parameterized modeling and scoring intelligence platform 200 is multi-tenant, the internal database 208 may include a number of database tables each storing records corresponding to individual user environments or accounts.

In some implementations, the use of the automated parameterized modeling and scoring intelligence platform 200 may first include initializing the internal database 208.

Initializing the internal database 208 may include a user of the automated parameterized modeling and scoring intelligence platform 200 uploading or otherwise storing, or causing to be stored, sets of data which may be processed using one or more software tools of the automated parameterized modeling and scoring intelligence platform 200. For example, in the example in which the automated parameterized modeling and scoring intelligence platform 200 is or includes software for parameterized score estimation for construction projects, the user of the automated parameterized modeling and scoring intelligence platform 200 may upload design metrics, historical project data, and/or other information which may be processed to estimate and/or optimize the scores 204. The uploading or other storing, or causing to be stored, of such data within the internal database 208 represents a one-time action such that the same data does not need to be stored in the internal database 208 again thereafter.

In some implementations, the automated parameterized modeling and scoring intelligence platform 200 may be configured to communicate with computing aspects within one or more external environments, such as an external environment 210. The external environment 210 may include an external application 212 representing software functionality implemented outside of the service environment 206. The external environment 210 may also include an external database 214 storing data used by or otherwise to implement the external application 212. The automated parameterized modeling and scoring intelligence platform 200 may be configured to receive information stored within the external database 214 such as through the external application 212. For example, an application programming interface (API) of the external application 212 may be made available to the automated parameterized modeling and scoring intelligence platform 200. An API call to the external application 212 may be made from the automated parameterized modeling and scoring intelligence platform 200, such as to retrieve certain data from within the external database 214 or to otherwise cause the external application 212 to transmit such data to the automated parameterized modeling and scoring intelligence platform 200.

For example, in implementations in which the automated parameterized modeling and scoring intelligence platform 200 is or includes software for parameterized score optimization for construction projects, the external database 214 can store external application data corresponding to real-world property information, such as market value attributions, used as input to the automated parameterized modeling and scoring intelligence platform 200.

The software tools of the automated parameterized modeling and scoring intelligence platform 200 may be configurable, such as by enabling a user of the automated parameterized modeling and scoring intelligence platform 200 to modify inputs to those software tools based on reported outputs from those software tools. For example, in implementations in which the automated parameterized modeling and scoring intelligence platform 200 is or includes software for parameterized score estimation for construction projects, a score representing a relatively high total estimated value may be reported to a user, who may then reconfigure values one or more of the design metrics used as input to the automated parameterized modeling and scoring intelligence platform 200, such as to achieve a different score thereby.

Figure 3:
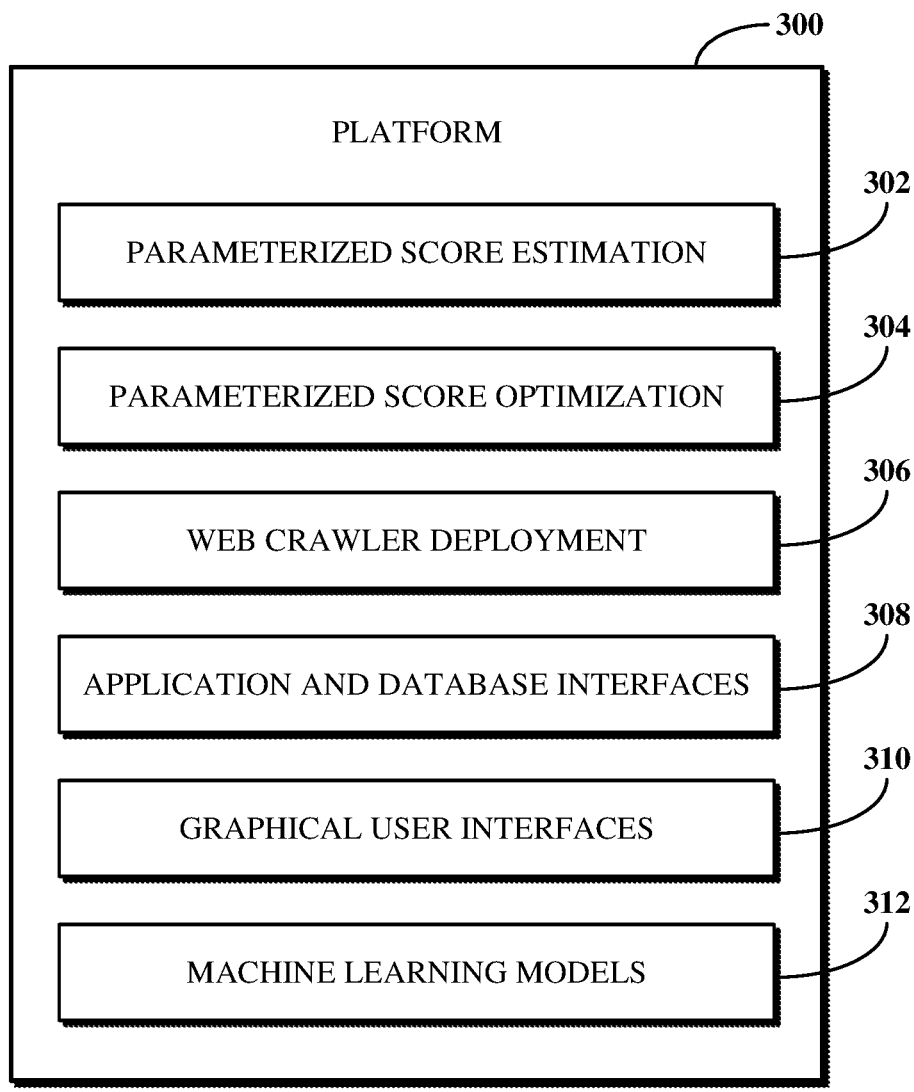
FIG. 3 is a block diagram showing examples of software tools of an automated parameterized modeling and scoring intelligence platform.

FIG. 3 is a block diagram showing an example of software tools, interfaces, and models of an automated parameterized modeling and scoring intelligence platform 300, such as the automated parameterized modeling and scoring intelligence platform 200 shown in FIG. 2. In the example as generally shown, the automated parameterized modeling and scoring intelligence platform 300 includes a parameterized score estimation software tool 302, a parameterized score optimization software tool, a web crawler deployment software tool 306, an application and database interfaces 308, GUIs 310, and machine learning models 312.

The parameterized score estimation software tool 302 is a software tool which processes a limited set of inputs to determine and output a score estimation. The parameterized score estimation software tool 302 extrapolates upon the limited set of inputs according to one or more selected processing criteria to determine the score estimation. In the example in which the parameterized score estimation software tool 302 is used for estimating scores for construction projects, the limited set of inputs may be or otherwise refer to a set of design metrics representing first input parameter values, and the one or more selected processing criteria may be or otherwise refer to a set of historical project data representing second input parameter values.

The design metrics may include values received as input from a user of the parameterized score estimation software tool 302. Alternatively, the design metrics may include values extracted automatically by the parameterized score estimation software tool 302, such as from a set of user data. The set of user data may refer to information stored within a database, such as a database of the automated parameterized modeling and scoring intelligence platform 300 (e.g., the internal database 208 shown in FIG. 2) or a database in an environment external to the automated parameterized modeling and scoring intelligence platform 300 (e.g., the external database 314 shown in FIG. 2). As a further alternative, the design metrics may include values generated using intelligence aspects of the automated parameterized modeling and scoring intelligence platform 300, for example, one or more of the machine learning models 312.

The one or more selected processing criteria may include indications of historical projects, which are constructions projects which have already been completed or otherwise for which design considerations have been finalized. A historical project may be represented by a set of historical project data, which may be stored in a database of the automated parameterized modeling and scoring intelligence platform 300 (e.g., the internal database 208) or a database in an environment external to the automated parameterized modeling and scoring intelligence platform 300 (e.g., the external database 314). The user of the parameterized score estimation software tool 302 may select one or more historical projects to use as guide criteria for the score estimation determination. Alternatively, the one or more historical projects may be selected by the parameterized score estimation software tool 302 or another aspect of the automated parameterized modeling and scoring intelligence platform 300, for example, using one or more of the machine learning models 312.

The score estimation determined and output by the parameterized score estimation software tool 302 may include or indicate a total estimated value attributed to the completion of the current project based on the limited set of inputs and according to the one or more selected processing criteria. The total estimated value may represent or otherwise indicate an estimated amount of one or more resources to use to complete the current project.

After a first score estimation is output, a user of the parameterized score estimation software tool 302 may modify one or more values of the design metrics, enable or disable one or more design metric categories, and/or change the selection of historical projects used. After making such changes, the user may cause the parameterized score estimation software tool 302 to determine a new score based on the changes. The score estimation output after the changes are made may not be the same as the score estimation output before the changes are made. In some implementations, a user of the parameterized score estimation software tool 302 may thus iteratively or otherwise configurably change input parameters used by the parameterized score estimation software tool 302, such as until a desired score estimation is output. The desired score estimation may thus represent a desired design expression for the current project which maximizes an expected cost-benefit ratio thereof. In some implementations, the specific values of the input parameters used to achieve the desired score estimation may then be recorded, such as within the database of the automated parameterized modeling and scoring intelligence platform 300.

The parameterized score optimization software tool 304 is a software tool which processes a set of inputs using external data to output a score optimization. The parameterized score optimization software tool 304 extrapolates upon the set of inputs according to external application data to determine the score optimization. In the example in which the parameterized score optimization software tool 304 is used for estimating scores for construction projects, the set of inputs may be or otherwise refer to a set of design metrics representing first input parameter values and a set of historical project data representing second input parameter values, and the external application data may be or otherwise refer to real-world property information, such as market value attributions, representing third input parameter values.

In some implementations, the extrapolation of the set of inputs may be based on processing performed by or otherwise using the parameterized score estimation software tool 302. For example, the first input parameter values and/or the second input parameter values, as the set of design metrics and the historical project data, respectively, may be parameter values used by or otherwise processed using the parameterized score estimation software tool 302. In some implementations, the first input parameter values and/or the second input parameter values may be recorded by the parameterized score estimation software tool 302, such as within a database (e.g., the internal database 208), and thereafter retrieved by the parameterized score optimization software tool 304. In some implementations, the first input parameter values and/or the second input parameter values may be received as input at the parameterized score optimization software tool 304, such as from a user thereof.

The real-world property information may include or otherwise refer to information representing property values for one or more real property sites. The real-world property information, as external application data, may be retrieved from one or more sources. For example, an external application from which the external application data may be retrieved include government websites (e.g., Register of Deeds or other department offices), commercial property assessment web sites which track real-world property information, or other sources, which may be online or offline.

The real-world property information may represent a current market value for a real property site. The current market value may be processed by the parameterized score optimization software tool 304 in connection with the set of design metrics and the historical project data to determine score optimizations. For example, a score optimization may refer to an optimized market valuation for a current project. A score optimization may be determined by processing the set of design metrics, representing design considerations for the current project, according to the historical project data, representing guides for resource estimation, and according to the current market value of one or more real property sites, representing an expected yield based on specific design qualities of those one or more real property sites. The one or more real property sites used may be selected by a user of the parameterized score optimization software tool 304. Alternatively, the parameterized score optimization software tool 304 may select the one or more real property sites, such as using an external application (e.g., the external application 212) and such as based on project similarities between the current project and such real property sites as may be available.

The score optimization determined and output by the parameterized score optimization software tool 304 may include or indicate an expected yield for the current project based on the set of design metrics, the historical project data, and the current market value of the one or more real property sites. The expected yield may represent or otherwise indicate an expected return on one or more resources to use to complete the current project.

After a first score optimization is output, a user of the parameterized score optimization software tool 304 may modify one or more values of the design metrics, enable or disable one or more design metric categories, change the selection of historical projects used, and/or change the selection of real property sites used. After making such changes, the user may cause the parameterized score optimization software tool 304 to determine a new score based on the changes. The score optimization output after the changes are made may not be the same as the score optimization output before the changes are made. In some implementations, a user of the parameterized score optimization software tool 304 may thus iteratively or otherwise configurably change input parameters used by the parameterized score optimization software tool 304, such as until a desired score optimization is output. The desired score optimization may thus represent a desired design expression for the current project which maximizes the expected yield thereof. In some implementations, the specific values of the input parameters used to achieve the desired score optimization may then be recorded, such as within the database of the automated parameterized modeling and scoring intelligence platform 300.

The web crawler deployment software tool 306 deploys web crawlers to a network to retrieve data which may be used by one or both of the parameterized score estimation software tool 302 or the parameterized score optimization software tool 304. A web crawler deployed by the web crawler deployment software tool 306 is a network bot configured to search through a data source (e.g., the internet). The web crawler may be configured for data scraping of one or more data sources. For example, the web crawler may be configured to search for data using an internet search engine, download some or all of a webpage, and extract some or all information from the downloaded webpage. The web crawler may be configured to report when data is retrieved, such as on an individual basis or on a batch basis (e.g., after a number of data pieces are retrieved). The data retrieved using a web crawler may be stored in a database of the automated parameterized modeling and scoring intelligence platform 300 (e.g., the internal database 208). A web crawler deployed by the web crawler deployment software tool 306 may use one or more techniques for crawling, including, without limitation, text pattern matching, HTTP programming, HTML parsing, DOM parsing, vertical aggregation, semantic annotation recognition, screen scraping, or computer vision analysis.

The application and database interfaces 308 are software aspects used to interface portions of the automated parameterized modeling and scoring intelligence platform 300 with external applications (e.g., the external application 212 shown in FIG. 2), databases (e.g., the internal database 208), and/or other data sources (e.g., Internet services which may be used to locate, identify, or otherwise retrieve data from an external database, such as using an external application). The application and database interfaces 308 may be or otherwise refer to a set of APIs, database management system interfaces, or the like. The application and database interfaces 308 may be included as default aspects of the automated parameterized modeling and scoring intelligence platform 300. In some implementations, the application and database interfaces 308 may be extended or otherwise configured, such as by a user of the automated parameterized modeling and scoring intelligence platform 300.

The GUIs 310 are GUIs which may be rendered or displayed, such as to render or display aspects of the parameterized score estimation software tool 302, the parameterized score optimization software tool 304, other functionality of the automated parameterized modeling and scoring intelligence platform 300, or a combination thereof. A GUI of the GUIs 310 can comprise part of a software GUI constituting data that reflect information ultimately destined for display on a hardware device, for example, the client 104 shown in FIG. 1). For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating the GUI or another GUI on a display that can be used to generate pixel information. A structured data output of one device can be provided to an input of the hardware display so that the elements provided on the hardware display screen represent the underlying structure of the output data.

The machine learning models 312 are software aspects which may be trained according to various input, such as those associated with past requests made to the automated parameterized modeling and scoring intelligence platform 300 (e.g., the requests 202 shown in FIG. 2) and which may thereafter be used for inference according to such training, for example, to identify, select, determine, or otherwise generate aspects associated with the processing of future requests made to the automated parameterized modeling and scoring intelligence platform 300. The machine learning models 312 apply intelligence to identify complex patterns in the input and to leverage those patterns to produce output and refine systemic understanding of how to process the input to produce the output. The machine learning models 312 may be used by the parameterized score estimation software tool 302 and/or by the parameterized score optimization software tool 304. The machine learning models 312 may be or include one or more of a neural network (e.g., a convolutional neural network, recurrent neural network, or other neural network), decision tree, vector machine, Bayesian network, genetic algorithm, deep learning system separate from a neural network, or other machine learning model.

Figure 4:
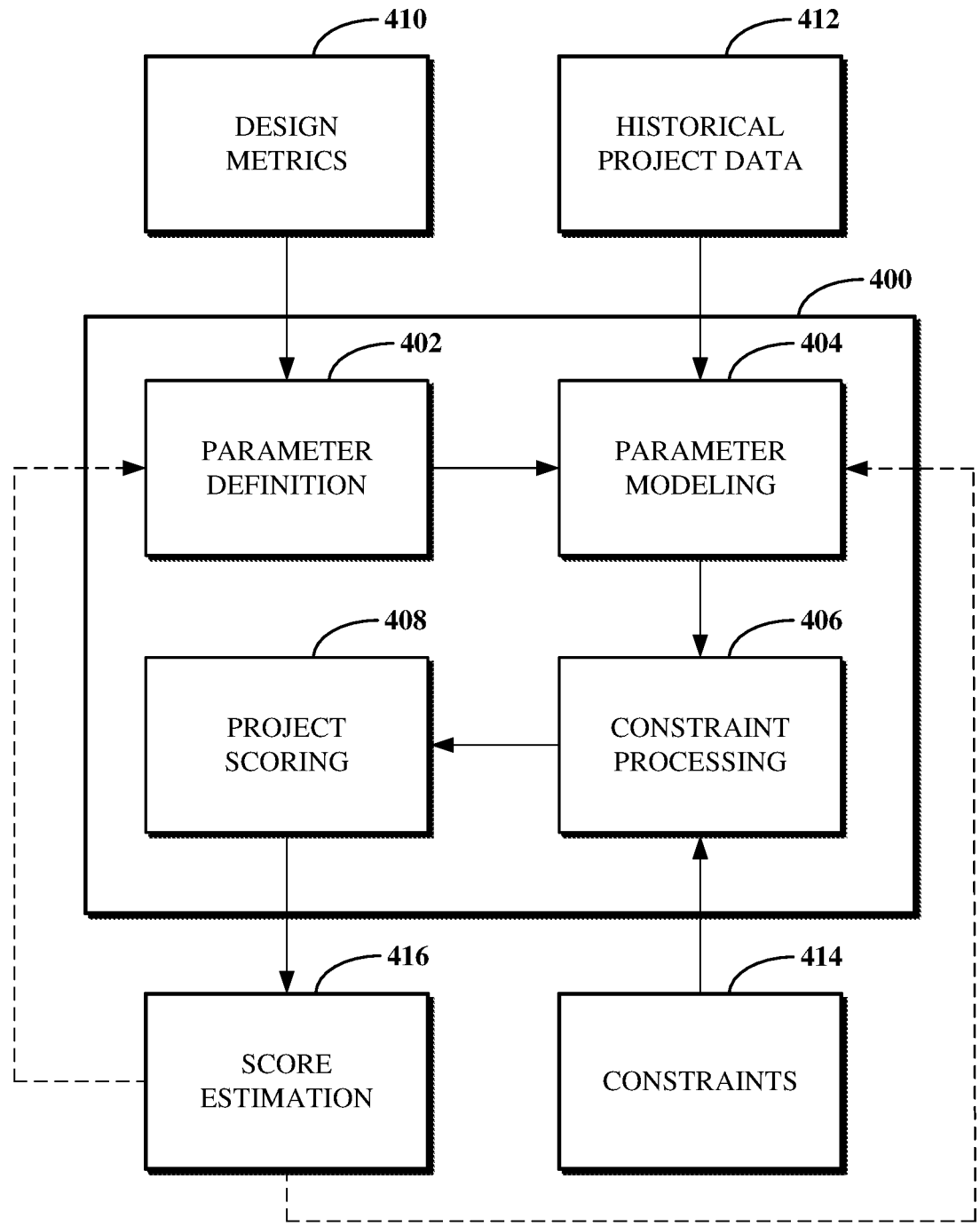
FIG. 4 is a block diagram of examples of functionality of a parameterized score estimation software tool of an automated parameterized modeling and scoring intelligence platform.

FIG. 4 is a block diagram of examples of functionality of a parameterized score estimation software tool 400 of an automated parameterized modeling and scoring intelligence platform, such as the automated parameterized modeling and scoring intelligence platform 200 shown in FIG. 2. For example, the parameterized score estimation software tool 400 may be the parameterized score estimation software tool 203 shown in FIG. 3. The parameterized score estimation software tool 400 in the example as shown includes a parameter definition tool 402, a parameter modeling tool 404, a constraint processing tool 406, and a project scoring tool 408.

The parameter definition tool 402 is used to define first input parameters used by the parameterized score estimation software tool 400. The first input parameters are design metrics 410. The design metrics are categories of current project design criteria which specify aspects of the current project design. The values provided as the design metrics 410 are used by the parameter definition tool 402 to define the first input parameters. Examples of the categories of design metrics to which the values provided as the design metrics 410 may correspond to include, but are not limited to, region, product type, construction type, lot size, construction duration, unit, average unit size, bedroom, bathroom, net rentable square footage, efficiency, gross square footage in wooden structure, wood levels, liner unit gross square footage, common area open square footage, pool/spa square footage, parking ratio, parking efficiency, garage levels, recreation/leasing, and retail. Units of measurement for some or all of these categories may vary.

In some implementations, the design metrics 410 may be further categorized into general information, building information, amenity and retail information, and garage information. For example, the general information may include design metrics relating to region, gross lot size, onsite street square footage, product type, and/or construction type. In another example, the building information may include design metrics relating to unit count, unit types (e.g., size, bedrooms, bathrooms, etc.), efficiency, and/or units in concrete. In yet another example, the amenity and retail information may include design metrics relating to amenities in wood, amenities in concrete, standalone amenities, retail in wood, retail in concrete, and/or standalone retail. In yet a further example, the garage information may include design metrics relating to parking information, parking efficiency, and/or garage levels.

Defining the first input parameters using the design metrics 410 includes plugging the values of the design metrics 410 into the respective parameter fields used by the parameterized score estimation software tool 400. In some implementations, the design metrics 410 may be received from or otherwise indicated by a user of the parameterized score estimation software tool 400. In some implementations, the parameter definition tool 402 may retrieve the design metrics 410, such as from a database of the automated parameterized modeling and scoring intelligence platform.

In some implementations, the design metrics 410 may be primary design metrics, and the parameter definition tool 402 can calculate secondary design metrics based on the primary design metrics. For example, categories of the design metrics 410 may be arranged hierarchically such that certain values within the design metrics 410 may feasibly fall within more than one primary design metric category, but only one secondary design metric category. The parameter definition tool 402 can calculate the secondary design metrics based on the context of the primary design metrics, for example, with reference to a value and unit of measurement therefore in connection with the specified primary design metric category.

The design metrics 410 may not represent a full take off of a design for the current project, for example, by listing complete information for linear square footage, square footage, and the like for various values. This may be because the design process is still in an early stage. Instead, a design metric that is readily available at early design stages and has a high correlation coefficient for current project items (e.g., concrete, windows, stucco, grading, etc.) may be designated as an alternative unit of measure.

The parameter modeling tool 404 is used to model the parameters defined using the parameter definition tool 402 according to historical project data 412. The historical project data 412 includes data relevant for modeling the design metrics 410 in the context of the current project, such as by evaluating comparisons to historical projects. The historical project data 412 may correspond to one or more historical projects, which may be selected by a user of the automated parameterized modeling and scoring intelligence platform or by the platform itself (e.g., by or otherwise using the parameter modeling tool 404 or another software tool). The historical projects used to identify the historical project data 412 may be selected based on one or more of a common budget scope with the current project, a common project type with the current project, a common set of materials or other design metrics with the current project, or other bases.

In some implementations, the parameter modeling tool 404 may calculate a similarity measurement for a historical project before it is selected. For example, the similarity measurement may represent values resulting from comparing one or more aspects of the historical project to one or more corresponding aspects of the current project. In some implementations, a historical project may be further considered only if the similarity measurement meets a threshold, which may be defined by the parameter modeling tool 404 or by a user thereof. In some implementations, multiple historical projects may be used together only where the similarity measurements determined between those multiple historical projects meets a threshold, which may be defined by the parameter modeling tool 404 or by a user thereof. The similarity measurement can be determined based on a one-to-one comparison of relevant design metrics. Alternatively, the similarity measurement can be weighted based on data relevance. For example, inputs corresponding to region, product type, and construction type may be considered the most relevant for the purpose of determining the similarity measurement.

Modeling the parameters defined using the parameter definition tool 402 can include identifying the parameters that correspond to values of the historical project data 412. For example, the parameter modeling tool 404 can process the historical project data 412 to determine which aspects of the historical project data 412 to use to process which aspects of the design metrics 410. In some implementations, the parameter modeling tool 404 may further model the defined parameters by applying weights to some or all of the defined parameters. For example, the weights may be defined by the historical project data 412, such as where the historical project data 412 indicates a greater relevance or importance of certain types of the design metrics 410 over other types thereof.

In some implementations, the parameterized score estimation software tool 400 may automate an analysis of a collection of historical project data to recommend certain project data as the historical project data 412 for a current project. For example, certain sets of historical project data may be considered more relevant and therefore selected for certain projects and/or for certain materials/services used for certain projects, such as may be indicated by the design metrics 410.

The historical project data 412 may represent data for previous projects of a user of the automated parameterized modeling and scoring intelligence platform who is using the parameterized score estimation software tool 400 for a current project. However, in some implementations, the parameterized score estimation software tool 400 may use historical project data from other users of the automated parameterized modeling and scoring intelligence platform. For example, where the automated parameterized modeling and scoring intelligence platform is implemented in a multi-tenant computing environment in which different users provide different sets of historical project data into a shared library, and the parameterized score estimation software tool 400 may select the historical project data 412 from the shared library. The historical project data may be anonymized such that individual historical project data items are not usable to identify the users from whom those data items derived.

The constraint processing tool 406 processes the modeled parameters against constraints 414 to control limits and other restrictions against the current project. Examples of the constraints 414 may include, but are not limited to, zoning requirements, covenants, envelope requirements, unit maximums, height maximums, and the like. The constraints 414 may be defined by or otherwise received from a user of the parameterized score estimation software tool 400. Alternatively, the constraints 414 may be retrieved from one or more external sources. For example, the constraints 414 may be retrieved from a website of a municipal zoning or like department office for the municipality in which the property associated with the current project is located. The constraint processing tool 406 uses the constraints 414 to cull design considerations which are not appropriate, such as because the constraint processing tool 406 recognizes them as violating one or more of the constraints 414.

The project scoring tool 408 receives the constraint-processed project information and determines a score estimation 416 for the current project based thereon. Score estimations can be determined for the current project as a whole and/or for individual items used in the current project. To estimate a score for the entire current project, the individual scores calculated for the various design metrics 410 modeled according to the historical project data 412 may be added, averaged, or input into a specialized formula which ultimately outputs the score estimation 416. A score for a given one of the design metrics 410 may be determined by leveraging corresponding data of the historical project data 412. For example, determining a score for a given one of the design metrics 410 may include calculating a cost escalation percentage for the historical project data, calculating the unit cost of each item based on the unit measurement preset therefor, and calculating the cost of each item by multiplying the calculated unit by the quantity associated with the unit of measure for the item.

An example of determining a score for a design metric corresponding to windows for a current project is now described. First, the parametric score estimation software tool 400 receives the design metrics 410 corresponding to the total number of bedrooms in the current project and a selection of some number of historical projects to use information from as the historical project data 412. The parametric score estimation software tool 400 retrieves information indicating a cost of windows and a total number of bedrooms from the selected historical projects. The parametric score estimation software tool 400 uses the retrieved information to calculate a unit cost representing a cost per bedroom count for the selected historical projects. The parametric score estimation software tool 400 then escalates the unit cost at a predefined annual percentage rate based on a completion date for the selected historical projects and based on a current date. The parametric score estimation software tool 400 then calculates an average of the escalated unit costs of the selected historical projects and multiples that calculated unit cost by the number of bedrooms specified in the design metrics 410 to determine the score estimation as a cost for the windows.

The score estimation 416 may be used to iterate the design metrics 410 and/or the historical project data 412, such as to result in a determination of a different score estimation. For example, a user of the parameterized score estimation software tool 400 can, based on the score estimation 416, change one or more aspects of the design metrics 410 and/or of the historical project data 412 to cause the parameterized score estimation software tool 400 to produce a different score estimation. In another example, the automated parameterized modeling and scoring intelligence platform which includes the parameterized score estimation software tool 400 may automate an iteration of the parameterized score estimation software tool 400 by changing one or more aspects of the design metrics 410 and/or of the historical project data 412 to cause the parameterized score estimation software tool 400 to produce a different score estimation. In some implementations, a design associated with the score estimation 416 may be transmitted to a user of the automated parameterized modeling and scoring intelligence platform. For example, the design associated with the score estimation 416 may include a list of items or materials to use in the current project. In another example, the design associated with the score estimation 416 may include a visual render of the design for the current project.

In some implementations, the parameterized score estimation software tool 400 can use machine learning functionality of the automated parameterized modeling and scoring intelligence platform, or such machine learning functionality can otherwise be used, to determine the score estimation 416. For example, a machine learning model (e.g., of the machine learning models 312 shown in FIG. 3) may be trained using training data sets made up on data samples. The data samples may include sets of training data including one or more pre-processed data points and one or more corresponding post-processed data points. For example, the data samples may include an initial parameter value (e.g., of the design metrics 410 or of the historical project data 412), an initial score estimation (e.g., the score estimation 416 before changes are made to the design metrics 410 or to the historical project data 412), a changed parameter value (e.g., the same parameter of the design metrics 410 or of the historical project data 412), and a new score estimation (e.g., the score estimation 416 resulting from the changes made to the design metrics 410 or to the historical project data 412). The data samples are used to train the machine learning model to recognize patterns in the behavior and/or relationships of the data. The training may include binary and/or multiclass classification, which may be supervised or unsupervised. In some embodiments, the classification can be performed using Naïve Bayes, K means clustering, or another approach.

In another example, a trained machine learning model may be used to perform inference against data sets, which may include the design metrics 410, the historical project data 412, and/or the score estimation 416. Performing inference against a data set includes applying patterns recognized by the training to the current data set to determine how to change some or all of the data, such as to arrive at a maximized or otherwise improved score estimation. For example, performing inference against a data set may include determining to change certain values of the design metrics 410 because the machine learning model training recognizes that the ultimate value gained from having a certain amount of some type of item or material is less than the ultimate cost associated therewith.

In some implementations, the parameter modeling tool 404 can output an alert indicating a scale warning when comparisons made between the design metrics 410 and values of the historical project data 412 are not identical or similar. For example, an alert may be output where a current project is for the development of a ten acre land size whereas a historical project instead was for the development of a one acre land size. The scale warning can thus be used to alert the software and/or the user that the score to be estimated for the current project will be substantively different from a score which may have been estimated for the corresponding historical project. For example, excavation costs may be higher even though the land purchase cost will be lower. In some implementations, machine learning or other intelligence functionality of the automated parameterized modeling and scoring intelligence platform can analyze differences in the project scales based on the outputs of scale warnings to identify scaling patterns and to apply those patterns upon the outputting of an alert.

Figure 5:
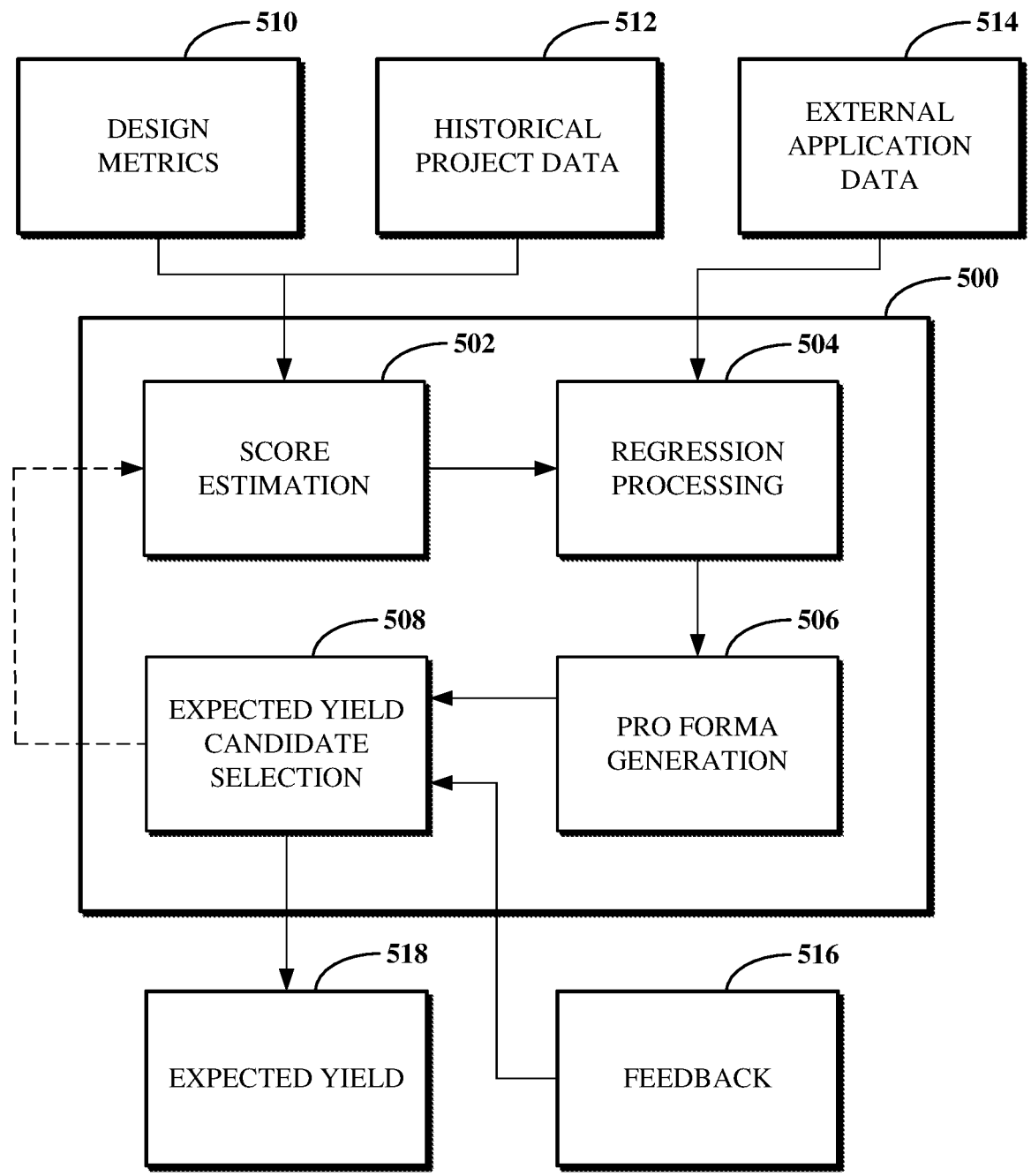
FIG. 5 is a block diagram of examples of functionality of a parameterized score optimization software tool of an automated parameterized modeling and scoring intelligence platform.

FIG. 5 is a block diagram of examples of functionality of a parameterized score optimization software tool 500 of an automated parameterized modeling and scoring intelligence platform, such as the automated parameterized modeling and scoring intelligence platform 200 shown in FIG. 2. For example, the parameterized score optimization software tool 500 may be the parameterized score optimization software tool 304 shown in FIG. 3. The parameterized score optimization software tool 500 in the example as shown includes a score estimation tool 502, a regression processing tool 504, a pro forma generation tool 506, and an expected yield candidate selection tool 508.

The score estimation tool 502 processes design metrics 510 and historical project data 512 to determine a score estimation for a current project based on a current design thereof. The design metrics 510 and the historical project data 512 may respectively be or otherwise refer to the design metrics 410 and the historical project data 412 shown in FIG. 4 after iteration to arrive at a desired score estimation. In some implementations, the score estimation tool 502 may be or refer to a parameterized score estimation software tool, for example, the parameterized score estimation software tool 400 shown in FIG. 4. The output of the score estimation tool 502 is a score estimation, which may, for example, represent a number of resources expected to be used for the current project.

The regression processing tool 504 processes external application data 514 against the output of the score estimation tool 502 to estimate a market value for the current project based on the current design thereof. The external application data 514 may be or otherwise refer to information associated with an external application, such as data stored within the external database 214 of the external application 212 shown in FIG. 2. For example, the external application data 514 may be or otherwise refer to market value information indicating values of one or more real property sites. In some implementations, the external application data 514 may be received directly from an external application, such as by the regression processing tool 504 or another aspect of the automated parameterized modeling and scoring intelligence platform making an API call to the external application. In some implementations, the external application data 514 may be retrieved using web crawlers deployed to the external application.

The regression processing tool 504 performs a regression analysis against the score estimation based on the external application data 514 to determine a market value estimate (e.g., as a rent estimate or other estimate) for aspects of one or more different projects (e.g., based on location, unit types (e.g., studio, one bedroom, etc.), unit sizes, etc.). For example, the regression processing tool 504 can use the external application data 514 to analyze and identify market value estimates for some or all of the different project aspects. Those market value estimates may then be used to determine the output of the regression processing tool 504. The output of the score estimation tool 502 may indicate score estimations for individual ones of the design metrics 510. The regression processing tool 504 can perform a regression analysis against combinations of those score estimations or against individual ones of those score estimations. The output of the regression processing tool 504 is a set of data indicating relationships between aspects of the current project and a market value estimate for the current project.

The pro forma generation tool 506 generates a pro forma for the current project based on the output of the regression processing tool 504. The pro forma generated by or otherwise using the pro forma generation tool 506 includes a set of records detailing some or all of the different construction projects for which market value estimates were determined by or otherwise using the regression processing tool 504 along with some or all of the score estimations determined by or otherwise using the score estimation tool 502. The pro forma may, for some or all of the different projects, indicate expected yields for those projects.

The expected yield candidate selection tool 508 provides expected yield candidates for selection, such as by a user of the automated parameterized modeling and scoring intelligence platform and/or by the platform itself. The expected yield candidate selection tool 508 processes feedback 516 against the output of the pro forma generation tool 506 to determine, generate, produce, or otherwise identify a set of expected yield candidates. The feedback 516 may be provided by a user of the automated parameterized modeling and scoring intelligence platform and/or by the platform itself. The feedback 516 may indicate to cull certain expected yield candidates, to temporarily ignore certain expected yield candidates, to further consider certain expected yield candidates, and/or to select an expected yield candidate as an expected yield 518 for ultimate output from the parameterized score optimization software tool 500.

Prior to selecting one of the expected yield candidates as the expected yield 518, a user of the parameterized score optimization software tool 500 may iterate against the output of the expected yield candidate selection tool 508, such as by changing one or more aspects of the design metrics 510, the historical project data 512, and/or the external application data 514. For example, where the design metrics 510 are expressed hierarchically, a user of the parameterized score optimization software tool 500 may change a primary design metric, which may cause or otherwise implicate the changing of one or more secondary design metrics. In some implementations, the parameterized score optimization software tool 500 itself may iterate against the output of the expected yield candidate selection tool 508, such as based on a set of constraints for the expected yield to select as the output of the parameterized score optimization software tool 500. For example, a constraint used to iterate against the output of the expected yield candidate selection tool 508 may indicate a minimum expected yield value. In the event the user of the parameterized score optimization software tool 500 or the software tool itself identifies a desired expected yield candidate, that candidate is output from the parameterized score optimization software tool 500 as the expected yield 518. In some implementations, a design associated with the expected yield 518 may be transmitted to a user of the automated parameterized modeling and scoring intelligence platform. For example, the design associated with the expected yield 518 may include a list of items or materials to use in the current project. In another example, the design associated with the expected yield 518 may include a visual render of the design for the current project.

The parameterized score optimization software tool 500 may thus be used to iterate through different design candidates for a current project and to identify an optimal one of those designs as the design which has the highest expected yield of the different design candidates. The automated expected yield candidate determination by the parameterized score optimization software tool 500 may thus be used to maximize a yield for the current project, such as by enabling a user thereof to identify design aspects which maximize the yield for his or her current project.

In some implementations, the parameterized score optimization software tool 500 may include or otherwise use a recommendation engine to recommend an expected yield candidate as the expected yield 518 output from the parameterized score optimization software tool 500. For example, the recommendation engine may analyze the expected yield candidates to determine values of the expected yields for each of them. The recommendation engine may then rank the expected yield candidates according to the determined values. In some implementations, the N (e.g., five) highest ranked expected yield candidates may be output for user review. The value of N may be configurable by a user or set by default. In some implementations, the recommendation engine may automatically output the highest ranked expected yield candidate as the expected yield 518 output from the parameterized score optimization software tool 500.

In some implementations, the parameterized score optimization software tool 500 can use machine learning functionality of the automated parameterized modeling and scoring intelligence platform, or such machine learning functionality can otherwise be used, to determine the expected yield 518. For example, a machine learning model (e.g., of the machine learning models 312 shown in FIG. 3) may be trained using training data sets made up on data samples. The data samples may include sets of training data including one or more pre-processed data points and one or more corresponding post-processed data points. For example, the data samples may include an initial parameter value (e.g., of the design metrics 510, of the historical project data 512, or of the external application data 514), an initial expected yield (e.g., the expected yield 518 before changes are made to the design metrics 510, to the historical project data 512, or to the external application data 514), a changed parameter value (e.g., the same parameter of the design metrics 510, of the historical project data 512, or of the external application data 514), and a new expected yield (e.g., the expected yield 518 after changes are made to the design metrics 510, to the historical project data 512, or to the external application data 514). The data samples are used to train the machine learning model to recognize patterns in the behavior and/or relationships of the data. The training may include binary and/or multiclass classification, which may be supervised or unsupervised. In some embodiments, the classification can be performed using Naïve Bayes, K means clustering, or another approach.

In another example, a trained machine learning model may be used to perform inference against data sets, which may include the design metrics 510, the historical project data 512, the external application data 514, and/or the expected yield 518. Performing inference against a data set includes applying patterns recognized by the training to the current data set to determine how to change some or all of the data, such as to arrive at a maximized or otherwise improved expected yield. For example, performing inference against a data set may include determining to change certain values of the design metrics 510 the machine learning model training recognizes that the ultimate expected yield gained from having a certain amount of some type of item or material is less than the ultimate cost associated therewith.

Figure 6:
FIG. 6 is an illustration showing an example of a graphical user interface (GUI) of a parameterized score estimation software tool.

FIG. 6 is an illustration showing an example of a GUI 600 of a parameterized score estimation software tool, such as the parameterized score estimation software tool 400 shown in FIG. 4. For example, the GUI 600 may be one of the GUIs 310 described above with respect to FIG. 3. The example of the GUI 600 as shown includes a design section on the left, a comps section in the middle, and a score section on the right. The design section displays information associated with the design metrics and values therefor which are defined as parameters used by the parameterized score estimation software tool. The comps section displays information associated with one or more selected historical projects, including measures of similarity to the current project and other relevant comparisons between the selected historical projects. The score section displays aspects of the score estimation determined and output by the parameterized score estimation software tool.

Figure 7:
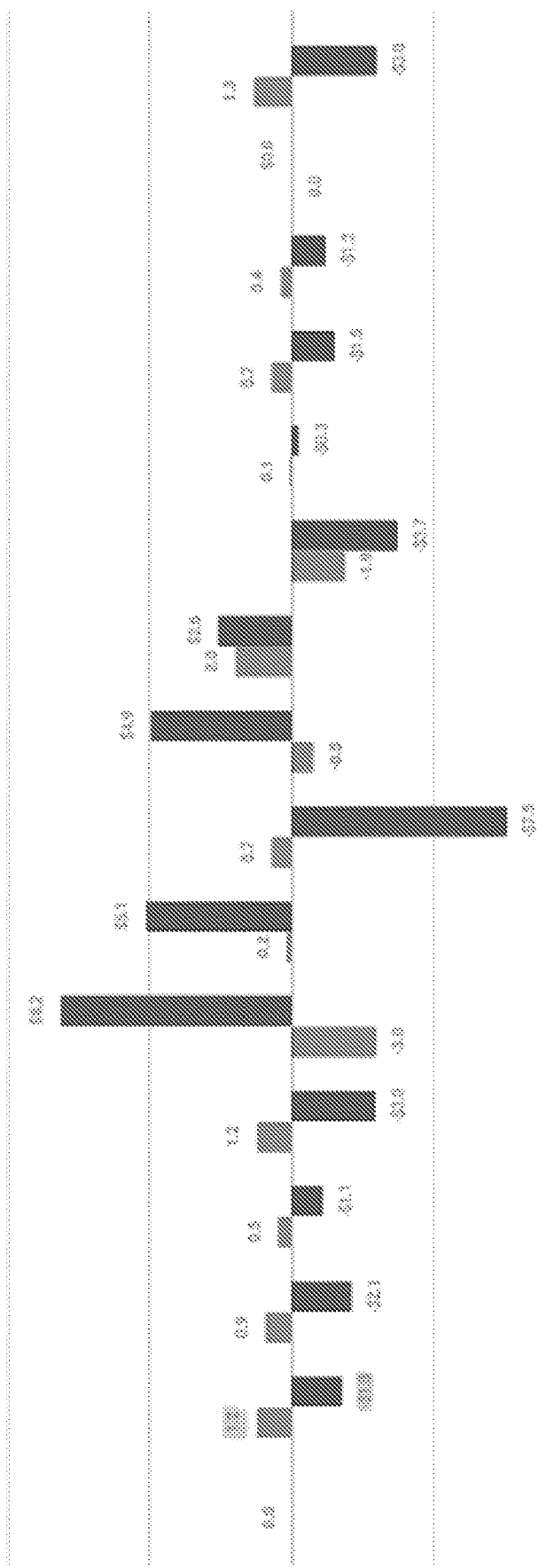
FIG. 7 is an illustration showing an example of a GUI of a parameterized score optimization software tool.

FIG. 7 is an illustration showing an example of a GUI 700 of a parameterized score optimization software tool, such as the parameterized score optimization software tool 500 shown in FIG. 5. For example, the GUI 700 may be one of the GUIs 310 described above with respect to FIG. 3. In particular, the GUI 700 shows an example of output of the parameterized score optimization software tool in the form of a chart. In some implementations, the GUI 700 may include a table in addition to or instead of the chart. The paired bars represent incremental design changes to the current project that creates a new design. In particular, the leftmost bar of each pair may represent a change in base points compared to the original project design, and the rightmost bar of each pair may represent a change in the overall net rentable square footage compared to the original project design.

Figure 8:
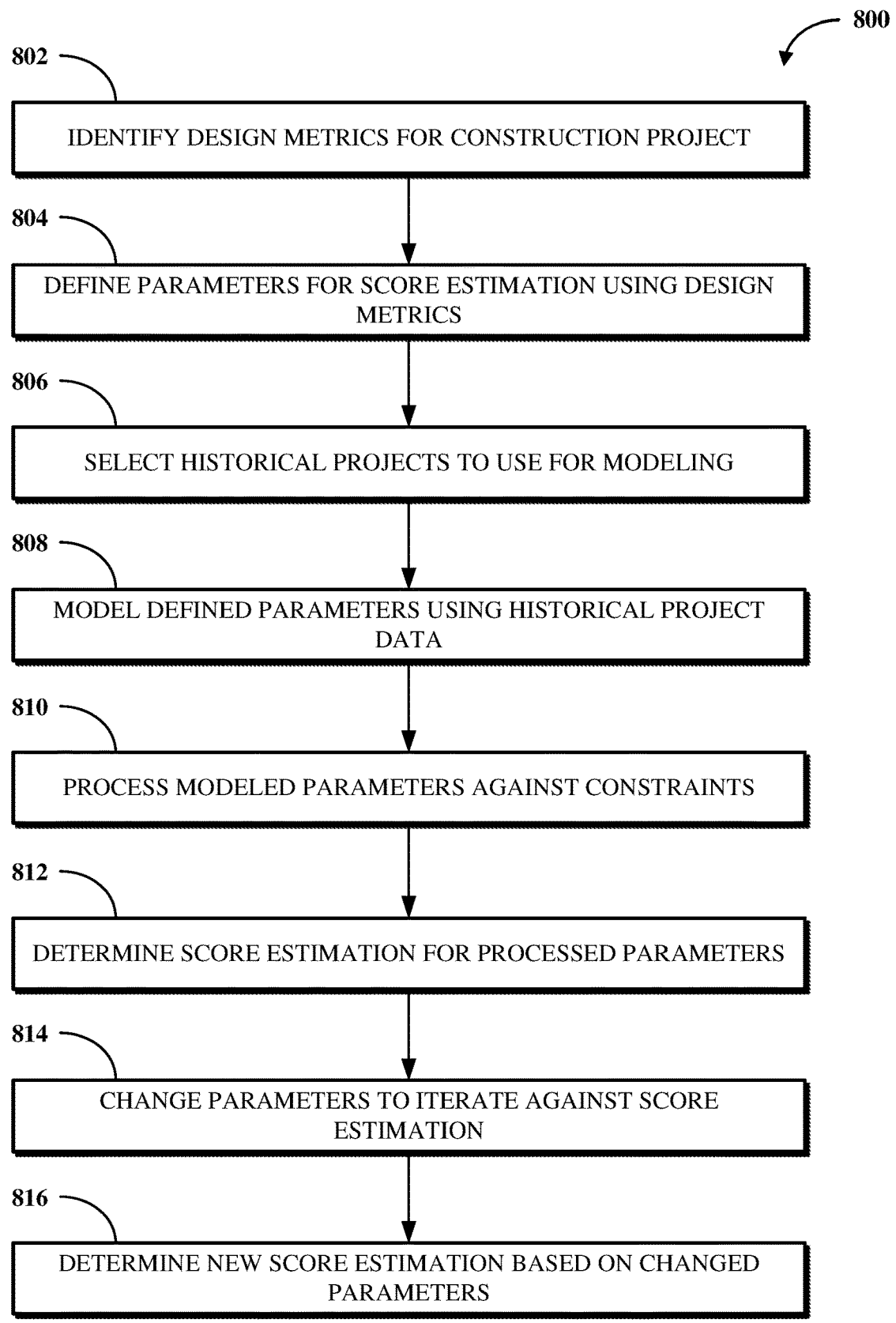
FIG. 8 is a flowchart showing an example of a technique for parameterized score estimation using an automated parameterized modeling and scoring intelligence system.
Figure 9:
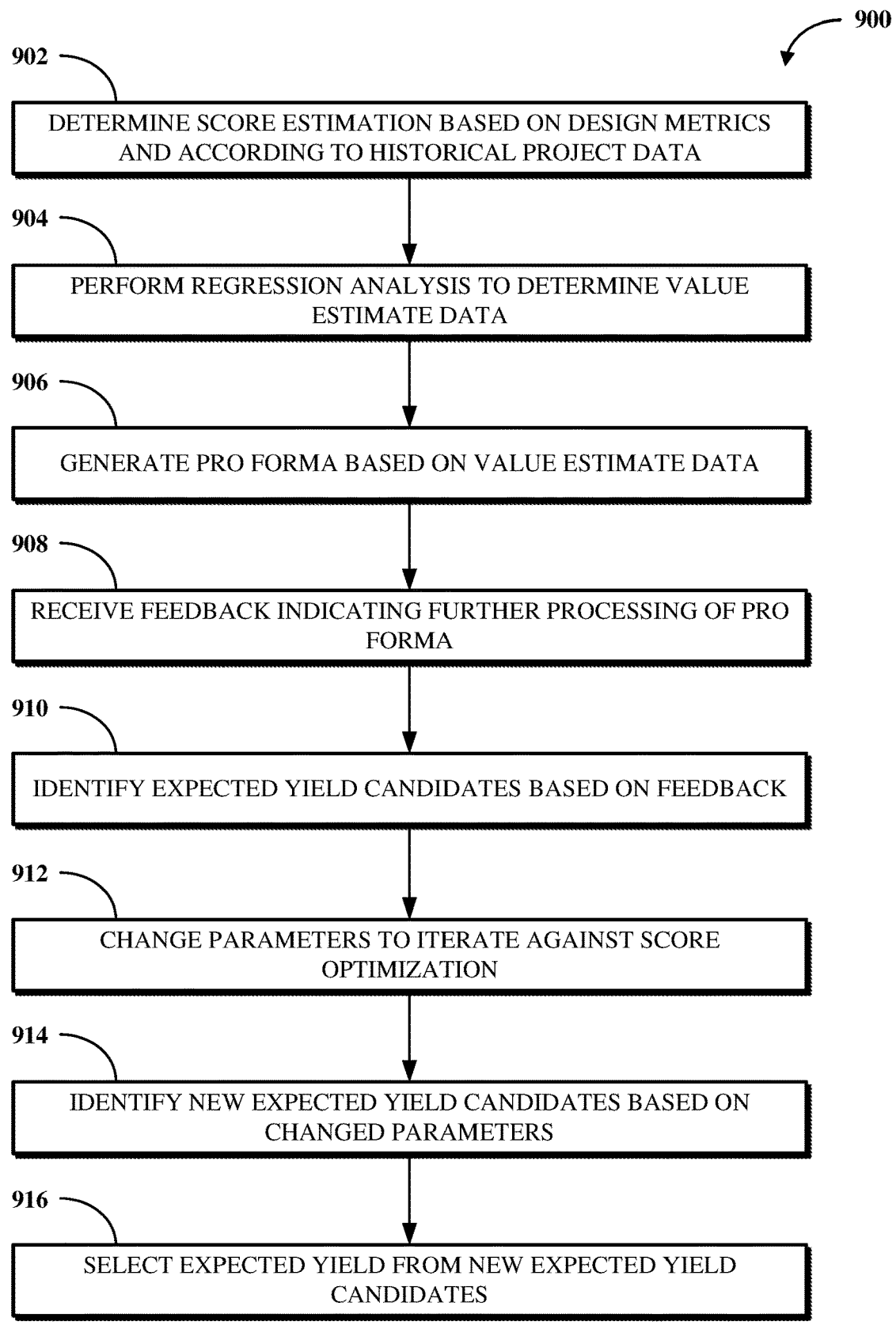
FIG. 9 is a flowchart showing an example of a technique for parameterized score optimization using an automated parameterized modeling and scoring intelligence system.

To further describe some implementations in greater detail, reference is next made to examples of techniques which may be performed by or using a region-based electrical intelligence system as described with respect to FIGS. 1-7. FIG. 8 is a flowchart showing an example of a technique 800 for parameterized score estimation using an automated parameterized modeling and scoring intelligence system. FIG. 9 is a flowchart showing an example of a technique 900 for parameterized score optimization using an automated parameterized modeling and scoring intelligence system.

The technique 800 and/or the technique 900 can be executed using computing devices, such as the systems, hardware, and software described with respect to FIGS. 1-7. The technique 800 and/or the technique 900 can be performed, for example, by executing a machine-readable program or other computer-executable instructions, such as routines, instructions, programs, or other code. The steps, or operations, of the technique 800 and/or the technique 900 or another technique, method, process, or algorithm described in connection with the implementations disclosed herein can be implemented directly in hardware, firmware, software executed by hardware, circuitry, or a combination thereof.

For simplicity of explanation, the technique 800 and the technique 900 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for parameterized score estimation using an automated parameterized modeling and scoring intelligence system is shown. At 802, design metrics for a current project are identified. At 804, parameters for score estimation using the design metrics are defined. At 806, one or more historical projects to use for modeling are selected. At 808, the defined parameters are modeled using the historical project data. At 810, the modeled parameters are processed against constraints. At 812, a score estimation is determined for the processed parameters. At 814, one or more of the initial parameters are changed to iterate the score estimation. At 816, a new score estimation is determined based on the changed parameter aspects. In some implementations, the technique 800 may include outputting a design associated with the new score estimation, such as by transmitting the design to a client device from which input parameters are received.

Referring next to FIG. 9, the technique 900 for parameterized score optimization using an automated parameterized modeling and scoring intelligence system is shown. At 902, a score estimation is determined for the current project based on design metrics for a current project and according to historical project data corresponding to one or more historical projects selected for modeling the design metrics. At 904, a regression analysis is performed against the score estimation based on external application data to determine value estimate data for the current project. At 906, a pro forma is generated based on the value estimate data. At 908, feedback indicating further processing of the pro forma is received. At 910, expected yield candidates are identified based on the feedback. At 912, one or more parameters are changed to iterate the score optimization. At 914, new expected yield candidates are identified based on the changed parameters. At 916, an expected yield candidate is selected from the new expected yield candidates. In some implementations, the technique 900 may include outputting a design associated with the selected expected yield candidate, such as by transmitting the design to a client device from which input parameters are received.

Figure 10:
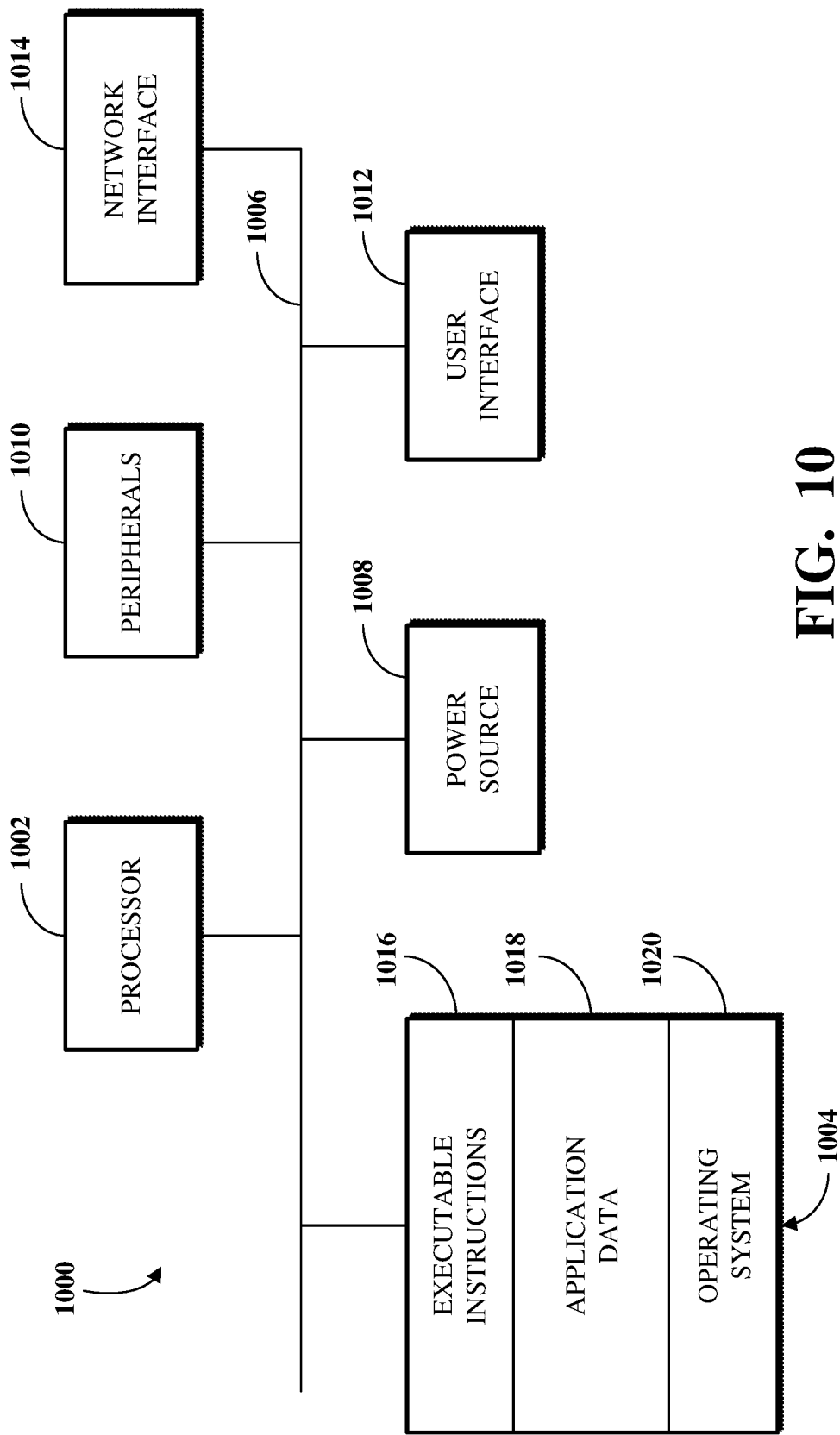
FIG. 10 is a block diagram showing an example of a computing device which may be used in an automated parameterized modeling and scoring intelligence system.

FIG. 10 is a block diagram showing an example of a computing device 1000 which may be used in an automated parameterized modeling and scoring intelligence system, for example, the automated parameterized modeling and scoring intelligence system 100 shown in FIG. 1. The computing device 1000 may be used to implement a server which implements some or all of a service environment (e.g., the service environment 108 shown in FIG. 1). Alternatively, the computing device 1000 may be used to implement a client that accesses the server (e.g., the client 104 shown in FIG.

1). As a further alternative, the computing device 1000 may be used as or to implement another client, server, or other device according to the implementations disclosed herein.

The computing device 1000 includes components or units, such as a processor 1002, a memory 1004, a bus 1006, a power source 1008, peripherals 1010, a user interface 1012, and a network interface 1014. One of more of the memory 1004, the power source 1008, the peripherals 1010, the user interface 1012, or the network interface 1014 can communicate with the processor 1002 via the bus 1006.

The processor 1002 is a central processing unit, such as a microprocessor, and can include single or multiple processors having single or multiple processing cores. Alternatively, the processor 1002 can include another type of device, or multiple devices, now existing or hereafter developed, configured for manipulating or processing information. For example, the processor 1002 can include multiple processors interconnected in any manner, including hardwired or networked, including wirelessly networked. For example, the operations of the processor 1002 can be distributed across multiple devices or units that can be coupled directly or across a local area or other suitable type of network. The processor 1002 can include a cache, or cache memory, for local storage of operating data or instructions.

The memory 1004 includes one or more memory components, which may each be volatile memory or non-volatile memory. For example, the volatile memory of the memory 1004 can be random access memory (RAM) (e.g., a DRAM module, such as DDR SDRAM) or another form of volatile memory. In another example, the non-volatile memory of the memory 1004 can be a disk drive, a solid state drive, flash memory, phase-change memory, or another form of non-volatile memory configured for persistent electronic information storage. The memory 1004 may also include other types of devices, now existing or hereafter developed, configured for storing data or instructions for processing by the processor 1002.

The memory 1004 can include data for immediate access by the processor 1002. For example, the memory 1004 can include executable instructions 1016, application data 1018, and an operating system 1020. The executable instructions 1016 can include one or more application programs, which can be loaded or copied, in whole or in part, from non-volatile memory to volatile memory to be executed by the processor 1002. For example, the executable instructions 1016 can include instructions for performing some or all of the techniques of this disclosure. The application data 1018 can include user data, database data (e.g., database catalogs or dictionaries), or the like. The operating system 1020 can be, for example, Microsoft Windows®, Mac OS X®, or Linux®; an operating system for a small device, such as a smartphone or tablet device; or an operating system for a large device, such as a mainframe computer.

The power source 1008 includes a source for providing power to the computing device 1000. For example, the power source 1008 can be an interface to an external power distribution system. In another example, the power source 1008 can be a battery, such as where the computing device 1000 is a mobile device or is otherwise configured to operate independently of an external power distribution system.

The peripherals 1010 includes one or more sensors, detectors, or other devices configured for monitoring the computing device 1000 or the environment around the computing device 1000. For example, the peripherals 1010 can include a geolocation component, such as a global positioning system location unit. In another example, the peripherals can include a temperature sensor for measuring temperatures of components of the computing device 1000, such as the processor 1002.

The user interface 1012 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 1014 provides a connection or link to a network (e.g., the network 116 shown in FIG. 1). The network interface 1014 can be a wired network interface or a wireless network interface. The computing device 1000 can communicate with other devices via the network interface 1014 using one or more network protocols, such as using Ethernet, TCP, IP, power line communication, Wi-Fi, Bluetooth, infrared, GPRS, GSM, CDMA, Z-Wave, ZigBee, another protocol, or a combination thereof.

Implementations of the computing device 1000 may differ from what is shown and described with respect to FIG. 10. In some implementations, the computing device 1000 can omit the peripherals 1010. In some implementations, the memory 1004 can be distributed across multiple devices. For example, the memory 1004 can include network-based memory or memory in multiple clients or servers performing the operations of those multiple devices. In some implementations, the application data 1018 can include functional programs, such as a web browser, a web server, a database server, another program, or a combination thereof.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc.

Likewise, the terms "system" or "mechanism" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system for automated parameterized modeling and scoring intelligence, the system comprising:
    a server device included in a service environment, the server device including a memory storing instructions, a network interface configured to provide communications between the server device and a client device, and a processor configured to execute the instructions stored in the memory to:
        train a machine learning model to determine an expected yield, wherein machine learning model is trained using one or more sets of historical project data, the historical project data including initial parameter values and initial expected yields for the initial parameter values;
        receive a data set for a current project, the data set including project parameters and historical project data stored within a database;
        implement the machine learning model to generate a first set of expected yields for a current project by determining a score estimation for the current project and performing a regression analysis against the score estimation based on application data associated with real property site information corresponding to the current project;
        implement the machine learning model to change at least some of the project parameters in the data set, to receive changed project parameters, by iterating through information associated with the current project based on the first set of expected yields according to patterns recognized from training data samples in the one or more sets of the historical project data;
        train again the machine learning model using the changed project parameters and the first set of expected yields;
        implement the machine learning model to determine a second set of expected yields for the current project based on second project parameters, the application data, and different values of the second project parameters; and
        output project parameters corresponding to a selected expected yield from among the second set of expected yields, wherein the changed project parameters are used in generating a project design for the current project.

2. The system of claim 1, wherein the instructions include instructions to:
    determine a score estimation for a project using a set of project parameters and the historical project data;
    determine score estimations for different values of the project using the different values of the set of project parameters and the historical project data;
    determine a market value estimate for a project parameter based on the score estimation for the project and the score estimations for alternative configurations of the project; and
    output data indicating a relation between the project parameter the market value estimate of the project.

3. The system of claim 2, wherein the instructions include instructions to:
    perform a regression analysis on the first set of expected yields versus the different values of the set of project parameters to determine the market value estimate for a project parameter.

4. The system of claim 2, wherein the instructions include instructions to:
    generate a pro forma for the current project based on the relation between the project parameter and the market value estimate of the project.

5. The system of claim 1, wherein the instructions include instructions to:
    compare the set of project parameters against the one or more sets of historical data stored within the database to determine that a similarity measurement between the current project and one or more historical projects meets a threshold.

6. The system of claim 1, wherein the instructions include instructions to:
    deploy web crawlers to one or more data sources over a network, wherein the web crawlers are configured to retrieve the application data from the one or more data sources; and
    store the application data within the database.

7. The system of claim 1, wherein the instructions include instructions to:
    use a recommendation engine to rank different values of the project parameters or the different values of the second project parameters.

8. The system of claim 1, wherein the instructions include instructions to:
    transmit, using the network interface, rendering instructions to the client device for rendering one or more graphical user interfaces of the system for automated parameterized modeling and scoring intelligence at the client device.

9. The system of claim 1, wherein the project parameters include primary design metrics and secondary design metrics hierarchically arranged, wherein changes to one of the primary design metrics causes changes to a corresponding one or more of the secondary design metrics.

10. A method for automated parameterized modeling and scoring intelligence, the method comprising:
training a machine learning model using one or more sets of historical project data to determine an expected yield for a given set of project parameter values, the historical project data including initial parameter values and initial expected yields for the initial parameter values;
receiving a data set for a current project, the data set including project parameters and historical project data stored;
implementing the machine learning model to generate a first set of expected yields for a current project by determining a score estimation for the current project and performing a regression analysis against the score estimation based on application data associated with real property site information corresponding to the current project;
implementing the machine learning model to change at least some of the project parameters in the data set, to receive changed project parameters, by iterating through information associated with the current project based on the first set of expected yields according to patterns recognized from training data samples in the one or more sets of the historical project data;
training again the machine learning model using the changed project parameters and the first set of expected yields;
implementing the machine learning model to determine a second set of expected yields for the current project based on second project parameters, the application data, and different values of the second project parameters; and
outputting project parameters corresponding to a selected expected yield from among the second set of expected yields, wherein the changed project parameters are used in generating a project design for the current project.

11. The method of claim 10, further comprising:
determining a score estimation for a project using a set of project parameters and the historical project data;
determining score estimations for different values of the project using the different values of the set of project parameters and the historical project data;
determining a market value estimate for a project parameter based on the score estimation for the project and the score estimations for alternative configurations of the project; and
outputting data indicating a relation between the project parameter and the market value estimate of the project.

12. The method of claim 11, further comprising:
performing a regression analysis on the first set of expected yields versus the different values of the set of project parameters to determine a market value estimate for a project parameter.

13. The method of claim 11, further comprising:
generating a pro forma for the current project based on the relation between the project parameter and the market value estimate of the project.

14. The method of claim 10, further comprising:
comparing the set of project parameters against the one or more sets of historical data stored within a database to determine that a similarity measurement between the current project and one or more historical projects meets a threshold.

15. The method of claim 10, further comprising:
deploying web crawlers to one or more data sources over a network, wherein the web crawlers are configured to retrieve the application data from the one or more data sources; and
storing the application data within a database.

16. The method of claim 10, further comprising:
using a recommendation engine to rank different values of the project parameters and the different values of the second project parameters.

17. The method of claim 10, further comprising:
transmitting rendering instructions to a client device for rendering one or more graphical user interfaces of a system for automated parameterized modeling and scoring intelligence.

18. A system for automated parameterized modeling and scoring intelligence, the system comprising:
a server device including a processor and a memory, wherein the processor executes instructions stored in the memory to:
train a machine learning model using one or more sets of historical project data to determine an expected yield for a given set of project parameter values, the historical project data including initial parameter values and initial expected yields for the initial parameter values;
receive a data set for a current project, the data set including project parameters and historical project data stored within a database;
implement the machine learning model to generate a first set of expected yields for a current project by determining a score estimation for the current project and performing a regression analysis against the score estimation based on application data associated with real property site information corresponding to the current project;
the machine learning model to change at least some of the project parameters in the data set, to receive changed project parameters, by iterating through information associated with the current project based on the first set of expected yields according to patterns recognized from training data samples in the one or more sets of the historical project data;
train again the machine learning model using the changed project parameters and the first set of expected yields;
implement the machine learning model to determine a second set of expected yields for the current project based on second project parameters, the application data, and different values of the second project parameters; and
output project parameters corresponding to a selected expected yield from among the second set of expected yields, wherein the changed project parameters are used in generating a project design for the current project.

19. The system of claim 18, wherein the instructions include instructions to:
determine a score estimation for a project using a set of project parameters and historical project data;
determine score estimations for different values of the project using the different values of the first set of project parameters and the historical project data;
determine a market value estimate for a project parameter based on the score estimation for the project and the score estimations for alternative configuration of the project; and output data indicating a relation between the project parameter the market value estimate of the project.

20. The system of claim 19, wherein the instructions include instructions to:
perform a regression analysis on the first set of expected yields versus the different values of the set of project parameters to determine a market value estimate for a project parameter.

* * * * *